United States Patent
Yagawa et al.

(10) Patent No.: US 7,318,133 B2
(45) Date of Patent: Jan. 8, 2008

(54) METHOD AND APPARATUS FOR REPLICATING VOLUMES

(75) Inventors: Yuichi Yagawa, San Jose, CA (US); Naoki Watanabe, Hachioji (JP); Claus Mikkelsen, San Francisco, CA (US)

(73) Assignee: Hitachi, Ltd., Tokyo (JP)

(*) Notice: Subject to any disclaimer, the term of this patent is extended or adjusted under 35 U.S.C. 154(b) by 326 days.

(21) Appl. No.: 10/795,121

(22) Filed: Mar. 4, 2004

(65) Prior Publication Data

US 2004/0250034 A1    Dec. 9, 2004

Related U.S. Application Data

(60) Provisional application No. 60/475,656, filed on Jun. 3, 2003.

(51) Int. Cl.
*G06F 12/16* (2006.01)
(52) U.S. Cl. .................. 711/162; 711/161; 707/204
(58) Field of Classification Search ............. 711/162, 711/161; 707/204
See application file for complete search history.

(56) References Cited

U.S. PATENT DOCUMENTS

| | | | | |
|---|---|---|---|---|
| 5,245,702 A | * | 9/1993 | McIntyre et al. ............ 345/541 |
| 6,671,705 B1 | * | 12/2003 | Duprey et al. ............... 707/204 |
| 2003/0191916 A1 | * | 10/2003 | McBrearty et al. ........... 711/162 |
| 2004/0073831 A1 | * | 4/2004 | Yanai et al. .................. 714/7 |

* cited by examiner

*Primary Examiner*—Hong Kim
*Assistant Examiner*—Jae Un Yu
(74) *Attorney, Agent, or Firm*—Townsend and Townsend and Crew LLP

(57) ABSTRACT

A method for operating a storage system includes providing a primary storage device and a secondary storage device. Data from a first storage volume is copied to a second storage volume using an internal mirror operation, the first and second storage volumes being provided within the primary storage device. The data received from the first volume is copied from the second storage volume to a third storage volume using a remote copy operation, the third storage volume being provided in the secondary storage device. The second storage volume is used for the remote copying to reduce the IO impact on the first volume. The third storage volume copies the data received from the second volume to a fourth storage volume using an internal mirror operation, the fourth storage volume being provided within the secondary storage device. The secondary storage system includes a fifth storage volume that is made available to a secondary host while the data from the third storage volume is being copied to the fourth storage volume, the secondary host being associated with the secondary storage device.

15 Claims, 6 Drawing Sheets

METHOD AND APPARATUS FOR REPLICATING VOLUMES

CROSS-REFERENCES TO RELATED APPLICATION

The present application claims benefit under 35 U.S.C. § 119 (e) of U.S. Provisional Application No. 60/475,656, filed Jun. 3, 2003, which is incorporated by reference.

BACKGROUND

The present invention relates to a storage system configured to copy data to a remote location.

Data is the underlying resources on which all computing processes are based. With the recent explosive growth of the Internet and e-business, the demand on data storage systems has increased tremendously. Generally, storage networking encompasses two applications or configurations: network-attached storage (NAS) or storage area network (SAN). A NAS uses IP over Ethernet to transports data in file formats between storage servers and their clients. In NAS, an integrated storage system, such as a disk array or tape device, connects directly to a messaging network through a local area network (LAN) interface, such as Ethernet, using messaging communications protocols like TCP/IP. The storage system functions as a server in a client-server system.

Generally, a SAN is a dedicated high performance network to move data between heterogeneous servers and storage resources. Unlike NAS, a separate dedicated network is provided to avoid any traffic conflicts between client and servers on the traditional messaging network. A SAN permits establishment of direct connections between storage resources and processors or servers. A SAN can be shared between servers or dedicated to a particular server. It can be concentrated in a single locality or extended over geographical distances. SAN interfaces can be various different protocols, such as Fibre Channel (FC), Enterprise Systems Connection (ESCON), Small Computer Systems Interface (SCSI), Serial Storage Architecture (SSA), High Performance Parallel Interface (HIPPI), or other protocols as they emerge in the future. For example, the Internet Engineering Task Force (IETF) is developing a new protocol or standard iSCSI that would enable block storage over TCP/IP, while some companies are working to offload the iSCSI-TCP/IP protocol stack from the host processor to make iSCSI a dominant standard for SANs.

Regardless of the types of storage system used, the data storage system users are interested in maintaining and/or copying data to a secondary site at a remote location. One reason for this is to provide a back-up data in order to prevent loss of valuable data from failure in a primary storage unit (or storage subsystem). Another reason is to provide a decision support process. Yet another reason is to perform data migration.

Currently, two operational modes are used by storage systems to copy the data to the secondary sites: synchronous mode and asynchronous mode. In synchronous mode, a write request from a host to the primary storage system completes only after write data are copied to the secondary storage system and acknowledge thereof has been made. Accordingly, this mode guarantees no loss of data at the secondary system since the write data from the host is stored in the cache of the primary system until the acknowledgement has be received from the secondary system. In addition, the primary volume (PVOL) in the primary storage system and the secondary volume (SVOL) in the secondary storage system are identically maintained, so that the SVOL can be used promptly used to replace the PVOL if the PVOL experiences failure. However, the primary and secondary storage systems cannot be placed too far apart, e.g., over 100 miles, under this mode. Otherwise, the storage system may not efficiently execute write requests from the host.

In asynchronous mode, a write request from a host to the primary storage system completes upon storing write data only to the primary system. The write data is then copied to the secondary storage system. That is, the data write to the primary storage system is an independent process from the data copy to the secondary storage system. Accordingly, the primary and secondary systems may be placed far apart from each other, e.g., 100 miles or greater. However, data may be lost if the primary system goes down since the PVOL and SVOL is not identically maintained.

BRIEF SUMMARY OF THE INVENTION

The present invention relates to providing an IO consistent copy image of a first primary volume, which is configured to receive IO requests from a primary host, to one or more secondary volumes in a secondary site without remote copying directly from the first primary volume to the secondary volumes. The present invention enables IO consistency to be maintained not only in a single volume but also among a group of volumes. Each volume described in the embodiments below may be a single volume or a group of volumes.

In one embodiment, the first primary volume is mirrored to second primary volume, and remote copied to an intermediate secondary volume from the second primary volume, and then copied to the one or more secondary volumes from the intermediate volume. The first primary volume does not perform the remote copy to the secondary volumes to reduce the IO impact on the first primary volume, and to enable the remote link from the first primary volume to be used in another operation. In one embodiment, the IO consistent image of the first primary volume is kept at two secondary volumes on an alternate basis, so that the consistent image of the first primary volume is made available without interruption for an application on a secondary host of the secondary site. The application may be a Decision Support System (DSS), remote backup system, and the like. The present invention may be used for various remote copy system including a disaster recovery system.

In one embodiment, a primary storage system at a primary site copies data from a first volume to a second volume. That is, the first volume is mirrored to the second volume. The data from the second volume is remotely copied to a third volume provided in a secondary storage system at a secondary site. The third volume is mirrored to a fourth volume in the secondary site. Alternatively, the third volume may also be mirrored to a fifth volume in the secondary site if the fourth volume has a previous mirror image of the third volume. The mirroring operations in the primary and secondary sites may be performed simultaneously. In one implementation, the internal mirror operations (e.g., VOL 1 to VOL 2 and VOL 3 to VOL 4) are synchronous copies, whereas the remote mirror operations (e.g., VOL 2 to VOL 3) are asynchronous copies. In another embodiment, both the internal and remote mirror operations are asynchronous copies.

The fourth and fifth volumes are configured to maintain a mirror image of the third volume in alternate basis. For example, the fourth volume is configured to mirror the third volume for a given one day, and the fifth volume is configured to mirror the third volume on the next day, and so on.

In one implementation, the steps below are performed in the primary and secondary storage systems to effectuate the above operations. Step 1 corresponds to FIG. 4A. Steps 2.1 to 2.6 correspond to FIG. 4B. Steps 2.7 to 2.10 correspond to FIG. 4C. The steps performed are as follows:

1. Resync Volmes (e.g., Vol1 to Vol2, Vol2 to Vol3 and Vol3 to Vol4)
2. If Swap-over timing then
   2.1. If Vol1 and Vol2 are under duplex
      (1) Suspend/Quiesce DB (or Freeze DB Write IO)
      (2) Split Vol1 and Vol2
      (3) Resume/Restart DB (or Run DB Write IO)
   2.2. Else Continue resync Vol1 and Vol2 until they become duplex
   2.3. If Vol2 and Vol3 are under duplex
      (1) Split Vol2 and Vol3
      (2) Resync Vol1 and Vol2 (restart internal mirroring at the primary storage)
   2.4. Else continue resync Vol2 and Vol3 until they become duplex
   2.5. If Vol3 and Vol4 (or Vol5) are under duplex
      (1) Split Vol3 and Vol4 (or Vol5)
      (2) Resync Vol2 and Vol3 (restart remote copying)
   2.6. Else continue resync Vol3 and Vol4 (or Vol5) until they become duplex
   2.7. Notify the agent at a secondary host to switch the link between the host and the volume (from Vol5 to Vol4, or Vol4 to Vol5)
   2.8. Wait for the switching of the link to be completed by the agent
   2.9. Switch the link of the internal mirroring in the secondary storage (from Vol3→Vol4 to Vol3→Vol5, or Vol3→Vol5 to Vol3→Vol4)
   2.10. Resync Vol3 and Vol5 or Vol3 and Vol4 (restart internal mirroring at the secondary storage).

In one embodiment, a method for operating a storage system includes providing a primary storage device and a secondary storage device. First data from a first storage volume is being copied to a second storage volume using an internal mirror operation at a predetermined time or swap-over timing, the first and second storage volumes being provided within the primary storage device. The first and second volumes are paired or synchronized prior to the swap-over timing. The first volume, which configured to receive IO requests from the primary host, is placed in a Suspend state (Quiesce DB) while the first and second volumes are under Duplex using a database module in a primary host. Then the first and second volumes are split to keep IO consistent mirror image of the first volume at the second volume. The first volume is then placed in a Resume DB state once the second volume is provided with a mirror image of the first volume, so that the primary host can resume writing to the first volume (i.e., second data). The first volume is placed in the above two states, so that IO consistency at the second volume may be obtained.

The second storage volume then copies the first data received from the first volume to a third storage volume using a remote copy operation, the third storage volume being provided in the secondary storage device. The third storage volume copies the first data to a fourth storage volume using an internal mirror operation, the fourth storage volume being provided within the secondary storage device. The secondary storage system includes a fifth storage volume that is made available to a secondary host while the data from the third storage volume are being copied to the fourth storage volume, the secondary host being associated with the secondary storage device.

After the fourth volume is provided with a mirror image of the third volume and these volumes are split, the secondary host's link to a volume in the secondary subsystem is switched from the fifth volume to the fourth volume, so that the secondary host may access data stored in the fourth volume, including the first data. The third volume is linked to the fifth volume, so that the fifth volume may receive second data from the third volume, the second data being associated with the next replication session, i.e., data written to the first volume by the primary hosts after placing the first volume in Resume DB and prior to placing the first volume in Quiesce DB once again. The second host's link is switched back to the fifth volume once the fifth volume is provided with a mirror image of the third volume including the second data. The third and fourth volumes are linked again to repeat the above steps. In one implementation, there may be more than two volumes to which the secondary host may be linked.

Using a multiple target secondary volumes (e.g., the fourth and fifth volumes), enables the replication sessions to be performed at various time intervals (e.g., once a day, once every 10 hours, once every two hours, once an hour, etc.) to reduce resynchronization time and provide more current data to the secondary host.

In another embodiment, a method for replicating a volume in a remote copy system includes synchronizing a first primary volume and a second primary volume, the first and second primary volumes being provided in a primary storage subsystem; splitting the first primary volume from the second primary volume once the second primary volume is provided with a mirror image of the first primary volume; synchronizing the second primary volume that is provided with the mirror image of the first primary volume with a first secondary volume provided in a secondary storage subsystem, the secondary storage system being provided at a remote location from the primary storage subsystem; and splitting the second primary volume from the first secondary volume once the first secondary volume is provided with a mirror image of the second primary volume; synchronizing the first secondary volume with a second secondary volume provided in the secondary storage subsystem, wherein a secondary host associated with the secondary storage subsystem is allowed to access a third secondary volume provided in the secondary storage subsystem while the first secondary volume and the second secondary volume are being synchronized.

In another embodiment, a computer readable medium includes a computer program for replicating a volume in a remote copy system. The computer program comprises code to synchronize a first volume and a second volume, the first and second volumes being provided in a primary storage subsystem; code to split the first volume from the second volume once the second volume is provided with a mirror image of the first volume; code to synchronize the second volume that is provided with the mirror image of the first volume with a third volume provided in a secondary storage subsystem, the secondary storage system being provided at a remote location from the primary storage subsystem; and code to split the second volume from the third volume once the third volume is provided with a mirror image of the second volume; code to synchronize the third volume with a fourth volume provided in the secondary storage subsystem, wherein a secondary host associated with the secondary storage subsystem is allowed to access a fifth volume while the third volume and the fourth volume are being synchronized, the fifth volume being provided within the secondary storage subsystem.

In yet another embodiment, a remote copy system for replicating a volume from a primary storage subsystem to another volume in a secondary storage subsystem includes a primary host including a script module to issue control commands; a primary storage subsystem including a first volume and a second volume to store data; means synchronizing the first volume and second volume; means for splitting the first volume from the second volume once the second volume is provided with a mirror image of the first volume; means for synchronizing the second volume that is provided with the mirror image of the first volume with a third volume provided in the secondary storage subsystem; and means for splitting the second volume from third volume once the third volume is provided with a mirror image of the second volume; means for synchronizing the third volume with a fourth volume provided in the secondary storage subsystem, wherein a secondary host associated with the secondary storage subsystem is allowed to access a fifth volume provided in the secondary storage subsystem while the third volume and the fourth volume are being synchronized, the fifth volume including a mirror image of the third volume from a previous replication session.

The advantages provided by embodiments of the present invention include enabling making of an IO consistent image of a primary volume continuously at a secondary site and the IO consistent image is always made available at the secondary site with minimal suspended time by reducing the time required to perform a resynchronization operation. The use of the intermediate primary volume (e.g., VOL 2) enables the remote mirroring to be performed with minimal impact on the primary volume (e.g., VOL 1).

As used herein, the term "storage system" refers to a computer system configured to store data and includes one or more storage units or storage subsystems, e.g., disk array units. Accordingly, the storage system may refer to a computer system including one or more hosts and one or more storage subsystems, or only a storage subsystem or unit, or a plurality of storage subsystems or units coupled to a plurality of hosts via a communication link.

As used herein, the term "storage subsystem" refers to a computer system that is configured to storage data and includes a storage area and a storage controller for handing requests from one or more hosts. The storage subsystem may be referred to as a storage device, storage unit, storage apparatus, or the like. An example of the storage subsystem is a disk array unit.

As used herein, the term "host" refers to a computer system that is coupled to one or more storage systems or storage subsystems and is configured to send requests to the storage systems or storage subsystems. The host may perform the functions of a server or client.

As used herein, the term "remote copy system" refers to a computer system that is configured to perform a remote copy function. The remote copy system may refer to a single storage system, subsystem or unit, or a plurality of storage units, systems, or subsystems that are linked by a network or communication link. The remote copy system also may include one or more hosts.

As used herein, the terms "synchronize" and "resynchronize" are used interchangeably. Similarly, any derivation of these two terms, e.g., synchronization and resynchronization, are also used interchangeably.

As used herein, the term "internal mirroring" refers to copying or transferring of data stored in a volume to another volume in the same storage subsystem.

As used herein, the term "remote copy" or "remote mirroring" refers to copying or transferring of data stored in a volume in a first storage subsystem to another volume in a second storage subsystem that is remotely located from the first storage subsystem. The distance between the first and second subsystems may vary according to desired implementations.

DETAILED DESCRIPTION

Figure 1:
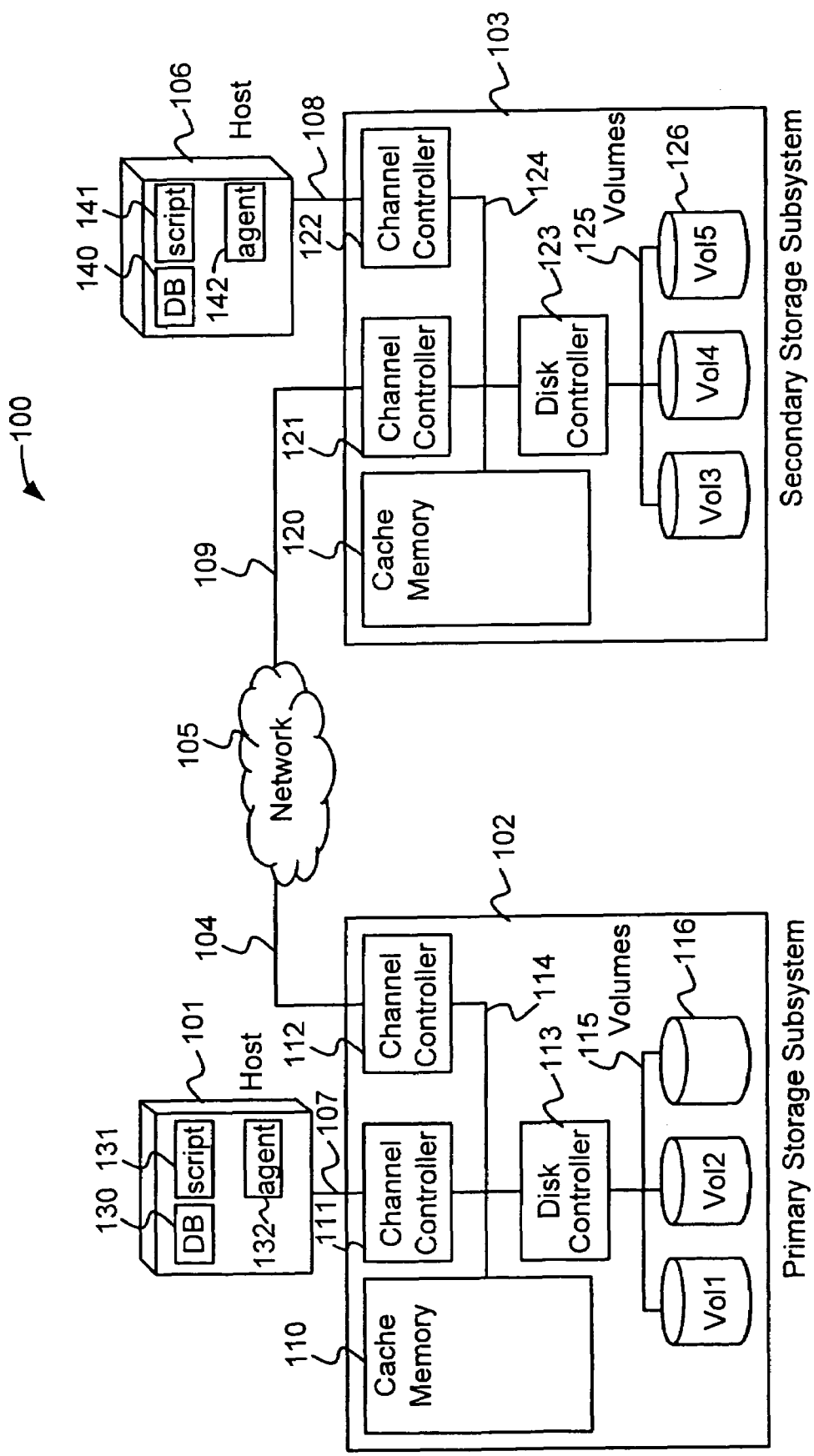
FIG. 1 illustrates a remote copy system according to one embodiment of the present invention.

FIG. 1 illustrates a remote copy system 100 according to one embodiment of the present invention. A primary site includes a primary host 101 and a primary storage system or subsystem 102. A secondary site includes a secondary host 106 and a secondary storage system or subsystem 103. The primary and secondary sites are coupled via a network 105. The network may include an extender to couple the two sites. In the present embodiment the network 105 couples the storage subsystems. Another separate network may be used to provide a separate communication link between the two hosts 101 and 106. Alternatively, the hosts 101 and 106 may share the network 105 with the storage subsystem 102 and 103.

Generally, a primary site is configured for normal, routine operations. The primary host 101 is coupled to the primary storage subsystem 102 via a communication link or network 107. The secondary host 106 and the secondary storage subsystem 103 are coupled to each other via a communication link 108. In the present embodiment, the communication links 107 and 108 are Fibre Channels, but other types of communication links may be used.

The primary host 101 includes a database (DB) module 130, a control script or module 131, and a storage control agent 132. The agent 132 controls the database module 130 and storage subsystem 102. The primary storage subsystem 102 includes a cache memory 110, a first channel controller 111, a second channel controller 112, a disk controller 113, and a plurality of disks 116.

The plurality of disks 116 are configured to store data and defines a plurality of volumes or logical units, where each volume is defined as a separate storage location. Each of the volumes or logical units is assigned with a Logical Unit Number (LUN) as identification information. One or more volumes may be mirrored with other volumes within the storage subsystem. In the present embodiment, a primary volume in the primary storage subsystem mirrors to an intermediary primary volume to a volume located at a remote secondary site to minimize the IO impact to the primary volume. The primary and secondary sites are coupled via a private line or wide area network (WAN).

The first channel controller 111 couples the primary host to the primary storage subsystem. The disk controller 113 interfaces between the first channel controller and the disks, so that the host could read or write data to the plurality of volumes defined on the disks. One of the functions performed by the disk controller 113 is to provide the logical volumes to the first channel controller 111. In the present embodiment, the cache memory 110 is used to temporarily store data to carry out the read and write operations more efficiently.

At the secondary site, the secondary host and storage subsystem are provided for backup, disaster recovery, data mining, and/or decision support purposes. In the present embodiment, the secondary host and storage subsystems are configured substantially identical to their counter parts at the primary site. Accordingly, the secondary host 106 includes an application module 140 (e.g., DSS or remote backup system), a control script module 141, and a control agent 142. The secondary storage subsystem 103 includes a cache memory 120, a first channel controller 121, a second channel controller 122, a disk controller 123, and a plurality of disks 126.

Figure 2:
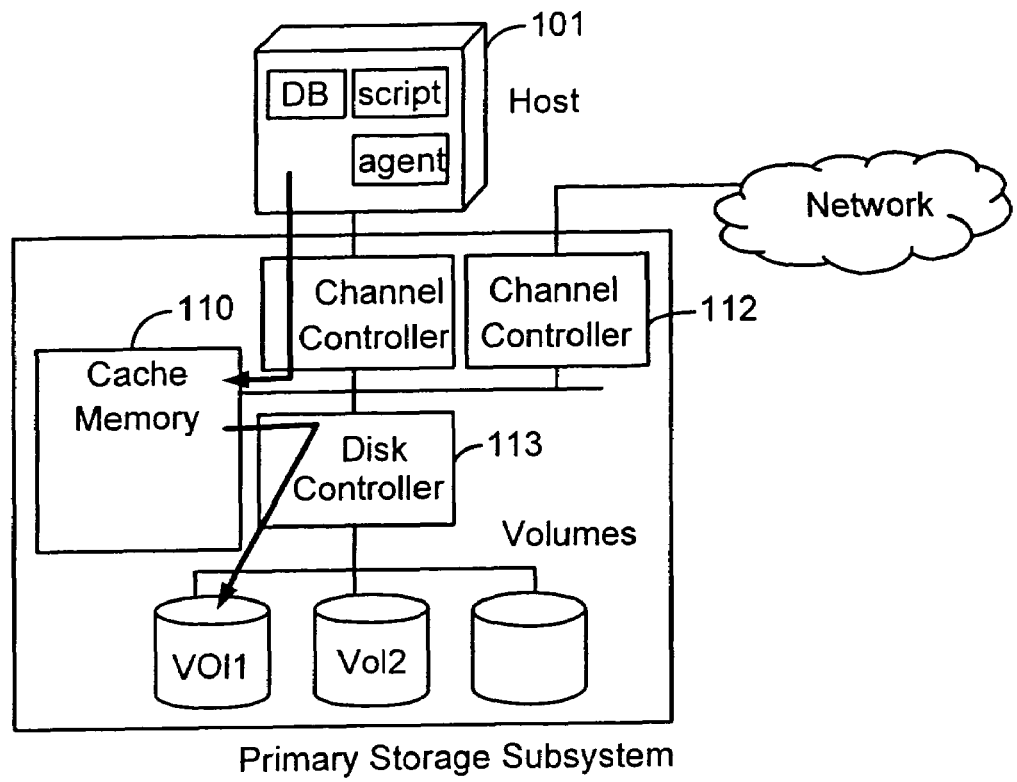
FIG. 2 illustrates a read or write operation in a primary storage subsystem according to one embodiment of the present invention.

FIG. 2 illustrates a read or write operation in a primary storage subsystem 102 according to one embodiment of the present invention. In one implementation, SCSI commands are used to perform the read or write operations. The host sends a read/write command to the first channel controller of the storage subsystem according to the SCSI protocol.

If the command is a write command, it includes data. The first channel controller 111 stores the data to the cache memory 110 and sends an IO command to the disk controller by converting the SCSI command received from the host to a suitable internal format. The first channel controller then waits to receive an acknowledgement from the disk controller 113. Once it is received, the first channel controller sends an acknowledgement to the host.

On the other hand, if a read command or the like that includes no data is received from the host, the first channel controller converts the SCSI command and sends an internal IO command to the disk controller. The disk controller retrieves the requested data and stores them in the cache memory and notifies the first channel controller. The first channel controller reads the data from the cache memory and transmits them to the host.

In addition to cooperating with the first channel controller to process the read and write commands of the host, the disk controller also performs the mirroring operations. The disk controller may also be configured to perform mirroring operations within the same storage subsystem (or an internal mirror operation) or to a remotely located storage subsystem (or a remote mirror operation). In the internal mirror operation, the disk controller mirrors data of a primary volume (volume 1) to an intermediate volume (volume 2)

Figure 3A:
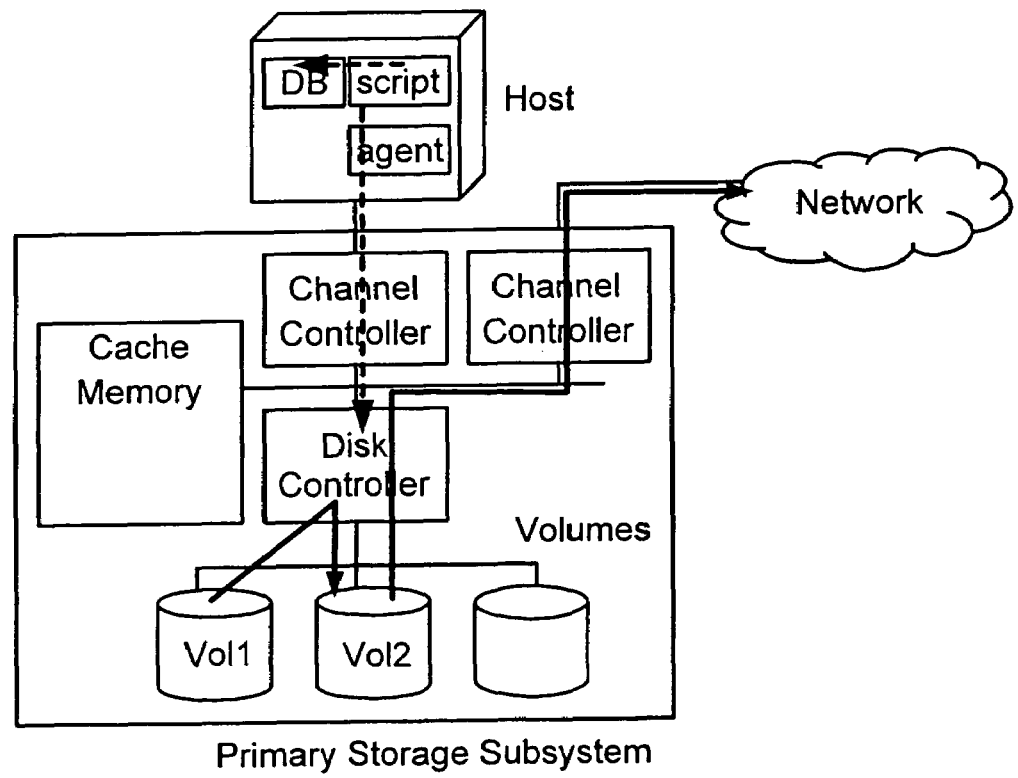
FIGS. 3A and 3B illustrate a remote mirror operation according to one embodiment of the present invention.
Figure 3B:
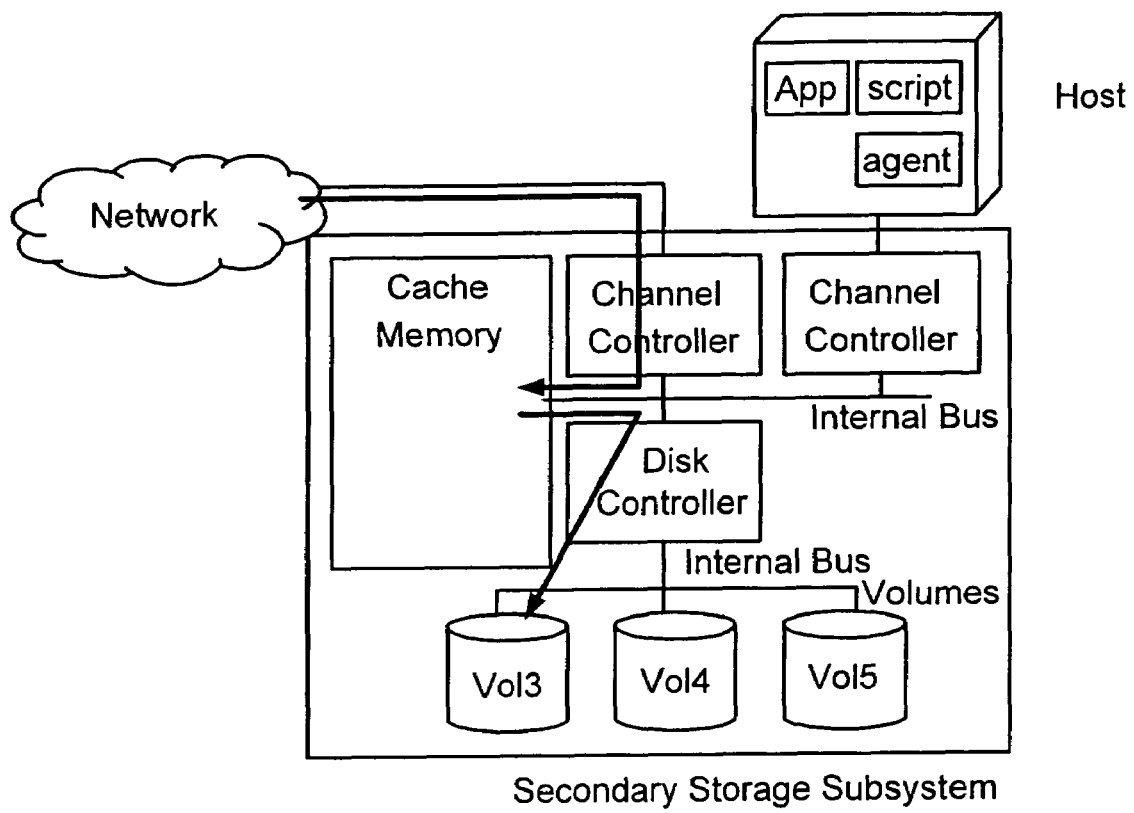

FIGS. 3A and 3B illustrate a remote mirror operation according to one embodiment of the present invention. The volume 2 in the primary storage subsystem 102 is mirrored to a volume 3 in the secondary storage subsystem 103. The volume 2 is a mirror volume of the volume 1. The dashed arrows in the primary storage system indicate the commands issued and processed by the primary host and the storage subsystem. The solid arrow indicates the path of data. As illustrated in FIG. 3A, the data from the volume 2 is retrieved by the disk controller 113 and transmitted to the secondary storage subsystem 103 via the second channel controller 112.

At the secondary site (FIG. 3B), the second channel controller 121 of the secondary storage subsystem 103 receives the data transmitted by the primary storage subsystem and stores them in the cache memory 120. The first channel controller 121 notifies the disk controller 123, which in turn retrieves the data from the cache memory and writes them to the volume 3. Accordingly, a remote mirror volume is provided at the secondary storage subsystem 103.

Figure 4A:
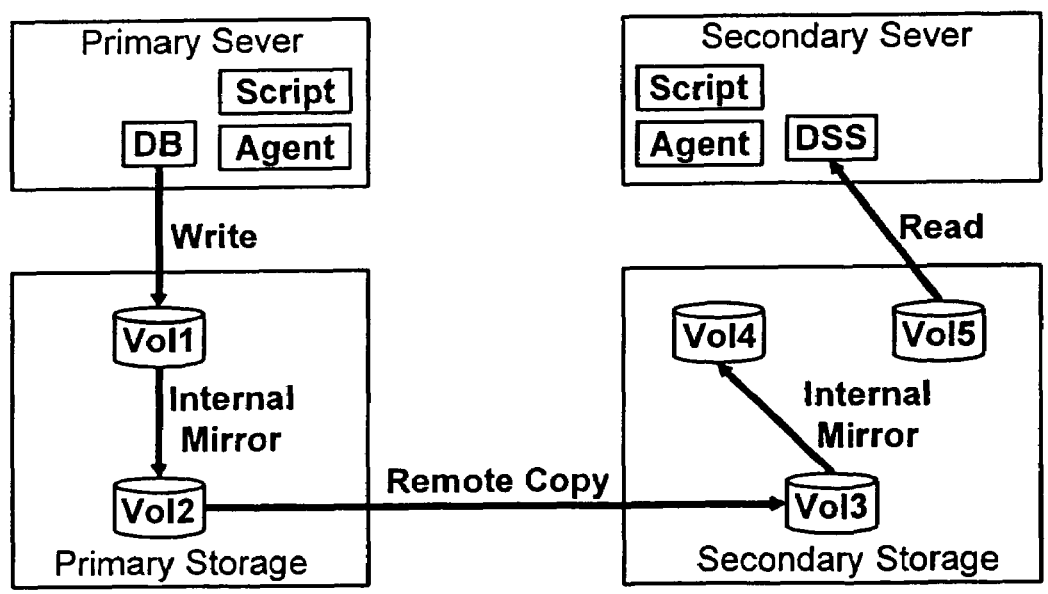
FIGS. 4A-4C illustrate diagrammatically a process for providing a remote mirror volume at a secondary site according to one embodiment of the present invention.
Figure 4B:
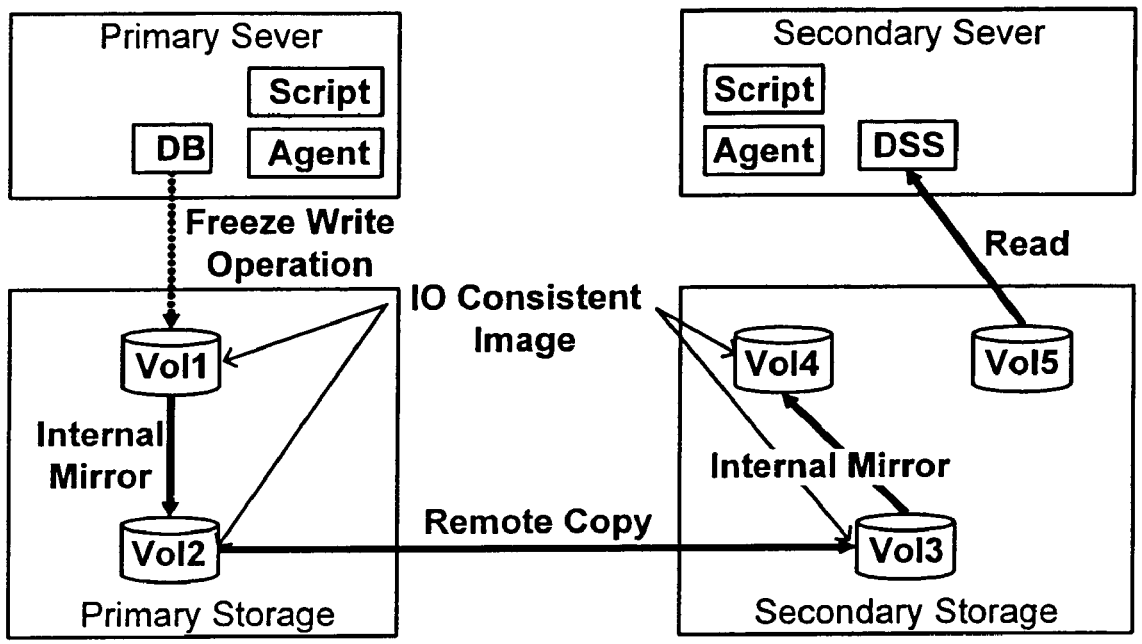
Figure 4C:
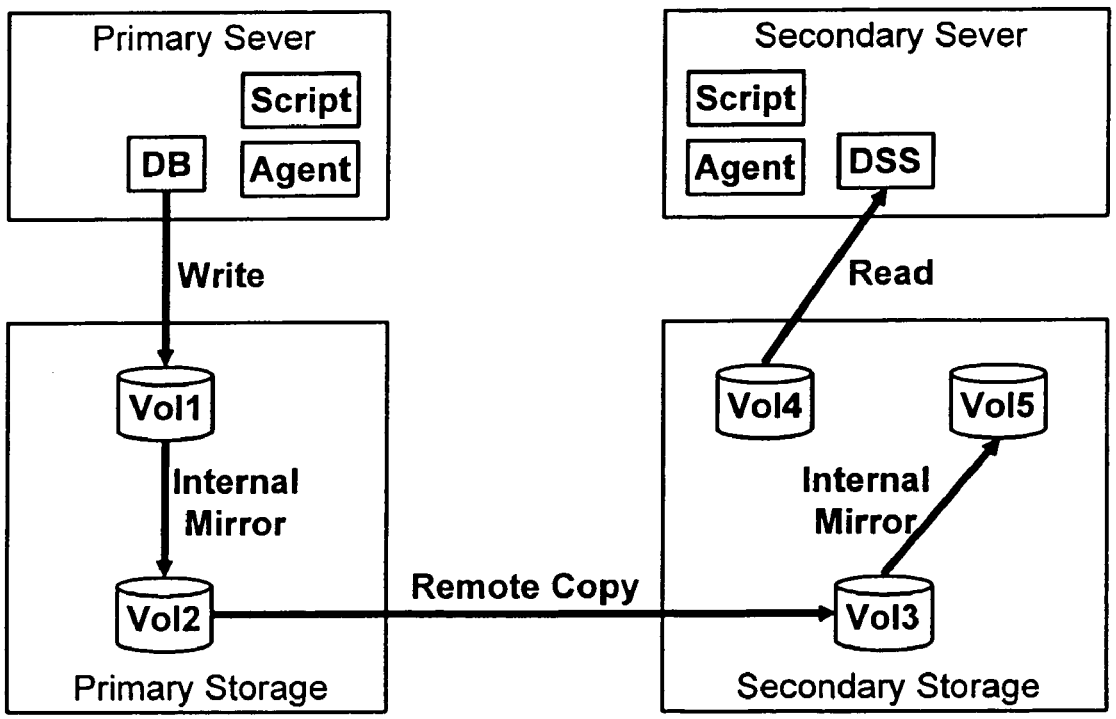

FIGS. 4A-4C illustrate diagrammatically a process for providing a remote mirror volume at a secondary site according to one embodiment of the present invention.

Referring to FIG. 4A, at first the script of the primary server or host issues a command to synchronize (or resynchronize) volumes 1 and 2. The volume 1 includes data written thereto by the database module of the primary host and is configured to receive IO requests from the primary hosts (or database module). The volumes 1 and 2 are synchronized by the disk controller (not shown) of the primary storage subsystem, so that the volume 1 is mirrored to the volume 2 via an internal mirror operation. This is done until the volumes 1 and 2 are in a Duplex state, i.e., have an IO consistent image.

While the internal mirror operation is being performed between the volumes 1 and 2, a remote copy operation is also being performed between the volume 2 and the volume 3, so that a remote mirror image of the volume 2 may be provided at the secondary site.

The secondary storage subsystem performs an internal mirror operation between the volumes 3 and 4. The volume 4 does not have an IO consistent image in one embodiment since the mirror operations are asynchronous. In the present embodiment, the internal mirror operation is performed using a bitmap copy operation. While the bitmap copy operation is being performed, the volume 4 cannot or preferably should not be accessed by the secondary host or server.

Accordingly, the volume 5 in the secondary storage subsystem, which is a mirror volume derived from a previous session, is used by the secondary host to perform data mining or decision support operations. That is, the volume 5 and a decision support system (DSS) associated with the secondary host are linked. At the next session, the volumes 3 and 5 are synchronized for an internal mirror operation while the volume 4 is made available to be accessed by the secondary host (or DSS), as explained in more detail later.

Referring to FIG. 4B, the script initiates a switch-over operation by issuing a suspend or quiesce command at a predetermined time to prevent the DB module from sending a write command to the volume 1 while it is being mirrored to the volume 2, so that the volume 2 may be provided with a mirror image of the volume 1 at a given point in time. Sometime after the suspend command has been issued, an IO consistent image is provided between the volumes 1 and 2 and a Duplex state is obtained.

In the present embodiment, the volumes 1 and 2 are resynchronized at predetermines intervals. Each of these intervals represents a single replication session, where each replication session provides a target volume with a mirror image of the volume 1 at a given point in time. In the present embodiment, the target volume is provided in a different storage subsystem from the volume 1, i.e., at the secondary subsystem. The secondary subsystem includes at least two target volumes (e.g., volumes 4 and 5) to be used in alternate sessions to reduce the resynchronization time and to provide more current data to the secondary host. There may be three or more target volumes in certain implementations.

In present embodiment, the internal mirror operation and the remote copy operation both involve bitmap copy operations and are performed asynchronously. In another embodiment, the internal mirror operation is performed synchronously while the remote copy operation is performed asynchronously. In both embodiments, the remote mirror operation is asynchronous to minimize the input/output (IO) impact on the volume 1 of the primary storage subsystem.

At a swap-over time, if the volumes 1 and 2 are in Duplex or provided with IO consistent images, the script of the primary host issues a command to split the volumes 1 and 2. The volume 1 is then placed in a Resume DB state, so that the primary host can write to the volume 1. If the volumes are not in Duplex at a given swap-over time, the volumes are allowed to continue being synchronized to each other, so that they may be split at a subsequent swap-over time.

In the present embodiment, the Duplex states of all paired volumes (e.g., the volumes 1 and 2, volumes 2 and 3, volumes 3 and 4, or volumes 3 and 5) are checked during a swap-over time to determined whether the paired volumes need to be split. A swap-over time is initiated at predetermined intervals, e.g., every 12 hours, every 6 hours, every 3 hours, every hour, etc.

The primary script resynchronizes the volumes 2 and 3 until these volumes are in Duplex. The volumes 2 and 3 are split once IO consistent images have been obtained. The volume 3 is resynchronized with the volume 4 to provide the volume 4 with an IO consistent image. These volumes are split once they are provided with the IO consistent images. The volume 2 may be resynchronized with the volume 1 to commence internal mirroring at the primary storage subsystem after the volume 2 is split from the volume 3.

Referring to FIG. 4C, once the volume 4 has been split from the volume 3, the volume 4 is free to be accessed by the DSS. Accordingly, the agent at the secondary host (or secondary agent) suspends or terminates the link between the DSS and the volume 5 and links the volume 4 to the DSS. The DSS may then access to the more current information stored in the volume 4. The secondary agent notifies the primary agent of the reestablished link between the DSS and volume 4. The volumes 2 and 3 are resynchronized to perform a remote copying operation once the volume 3 is split from the volume 4.

The primary agent establishes a link between the volume 3 and the volume 5 to provide the latter with a mirror image of the former. Once the volume 5 is provided with a mirror image, the secondary host and the volume 5 are linked again, enabling the secondary host to access the data stored in the volume 5. The volume 4 is linked to the volume 3 to receive the next batch of data. Accordingly, the volumes 4 and 5 are used as target volumes in alternate sessions. In the present embodiment, the agent sends control information that is used by the disk controller to establish this link between the volumes 3 and 5.

Figure 5:
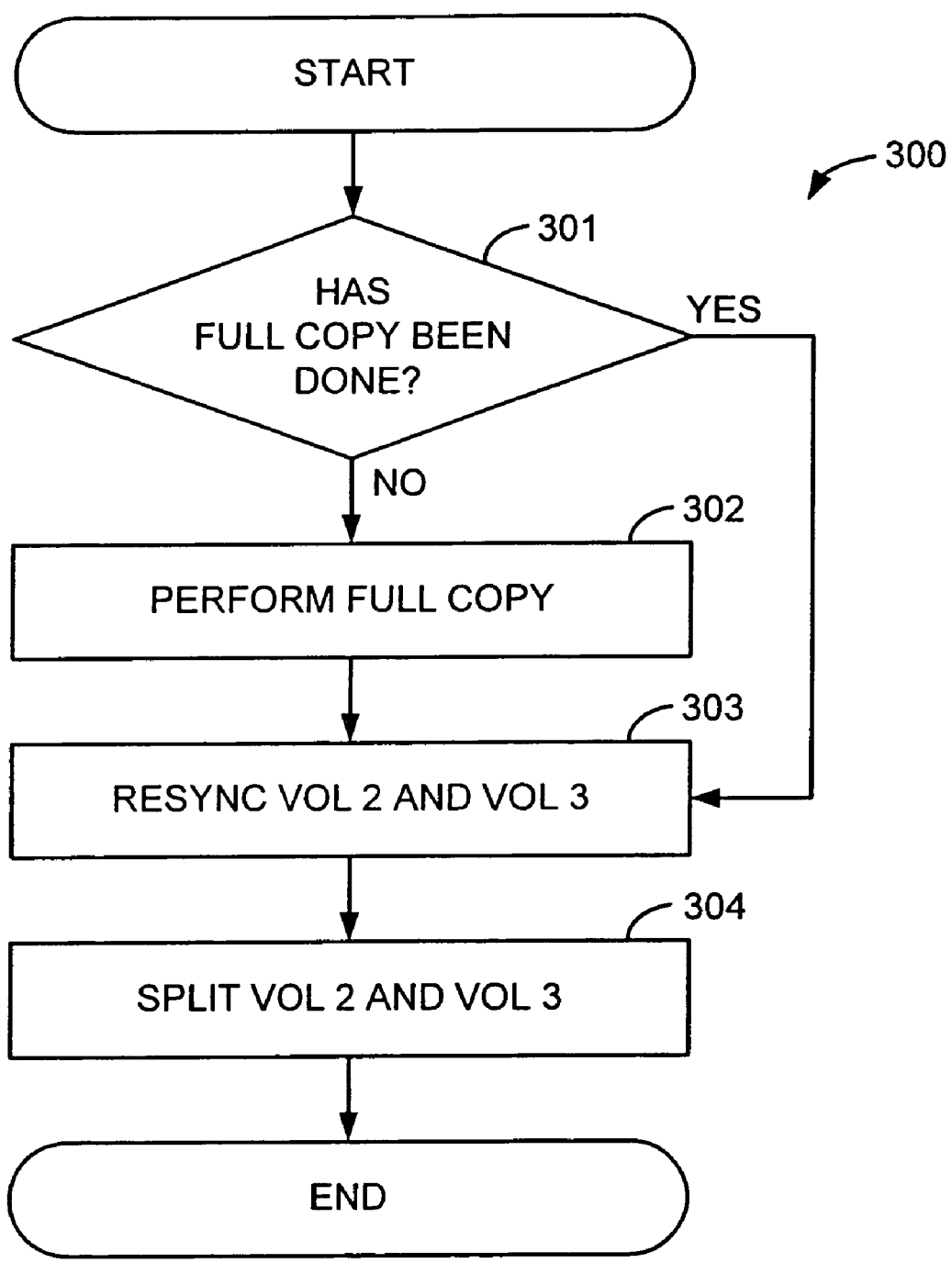
FIG. 5 illustrates a process for performing a remote copy of the data from a source volume in a primary site to a target volume in a secondary site according to one embodiment of the present invention.

FIG. 5 illustrates a process 300 for performing a remote copy of the data from the volume 2 (or source volume) in the primary site to the volume 3 (or target volume) in the secondary site according to one embodiment of the present invention. The script 131 in the primary host specifies the source and target volumes. The volumes 3 and 4 are paired as the source and target volumes prior to copying the data.

This is prepared by creating a configuration file at the primary host. Table 1 illustrates an exemplary configuration file for an open system.

TABLE 1

| Conf3 for VOL 2 on primary storage | Conf4 for VOL 3 on secondary storage |
|---|---|
| #name    port# TID LUN | #name    port# TID LUN |
| oradev12 CL2-D 3    2 | oradev12 CL3-D 1    3 |

In Table 1, the Name field indicates the device name for a given pair of volumes. The port field indicates to the channel controller number (CL#) and the port number (A-D), as required by Fibre Channel protocol. The TID field indicates the target ID in SCSI protocol. The LUN field indicates a logical unit number of a volume for a given TID.

Figure 6:
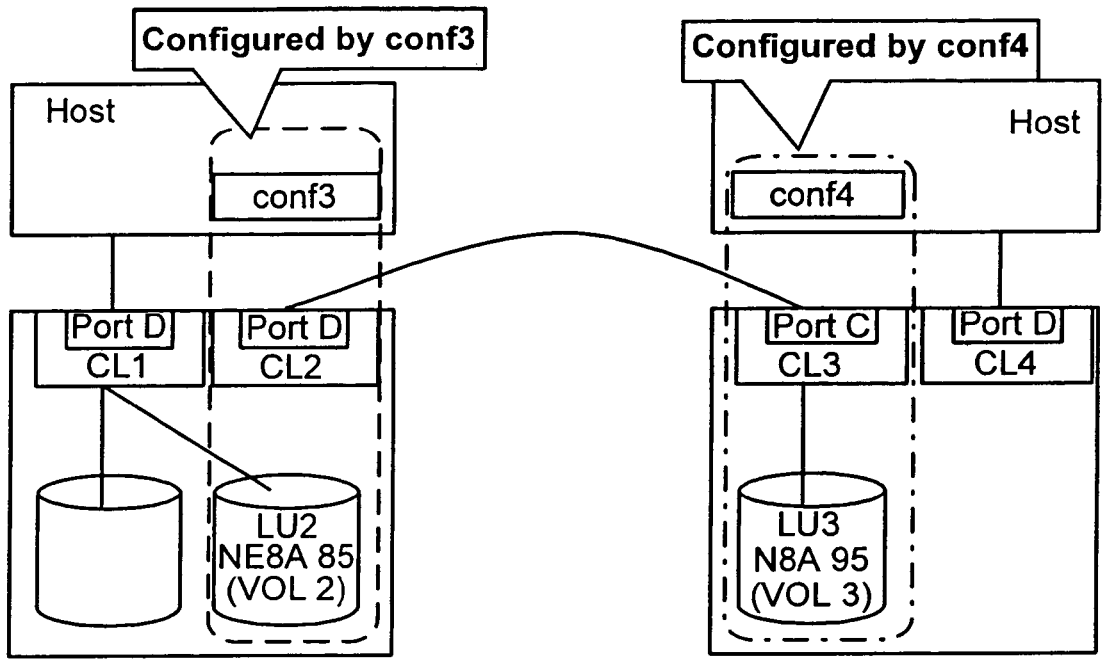
FIG. 6 illustrates diagrammatically a result of the process of FIG. 5.

In a multiple virtual system (MVS), it is assumed that the serial number is NE8A80, the address ccuu is 8A80, and the location in LSS=00 for the primary volume (or source volume) while the serial number is NE8A95, the address ccuu is 8A95, and the location in LSS=01 for the secondary volume (or target volume). In such an environment, the script 131 issues the following commands. The result of this configuration is illustrated by FIG. 6.

```
PPRCOPY ESTPATR DDNAME (NE8A95)
LSS (X'00', X'01')
PRIM (X'6000' FC131 X'85')
SEC (X'6001' FC131 X'95')
MODE (COPY) MSGREQ (YES)
PACE (15) CRIT (NO)
```

Referring back to the process 300, at step 301, it is determined whether or not a full copy has already been performed. If a full copy has been performed, the process skips to step 303. Otherwise, the process proceeds to step 302.

At step 302, the data from VOL 2 is mirrored to VOL 3 using a bit map technique. For this technique, a bitmap table is maintained for each region within a given volume. If any modification to a region in the volume is made, the channel controller sets a bit for that region. When copying data between volumes, the channel controller compares the bitmaps of the volumes and copy data from the source volume to the target volume if there is a difference between the bitmaps. In an open system, the script 131 issues the following command to the agent 132.

```
Createpair –3 oradev12
```

In MVS, the script issues the following commands.

```
COPY FULL
IDY (NEBA95)
ODY (NE8A85)
ALLDATA (*) PRG
```

IDY indicates the target of the copy, and ODY indicates the source of the copy. The serial number of the volume is indicated when a full copy is to be performed.

At step 303, the channel controller in the primary site resynchronizes VOL 2 (source volume) and VOL 3 (target volume) to make a mirror image for a given point in time. This resynchronization process uses a bitmap technique described in connection with step 302.

The following operation is performed for an open system.

```
pairresync -3 oradev12
```

The following operation is performed for MVS.

```
PPRCOPY ESTPAIR DDNANE(NE8A80)
    LSS (X'00', X'01')
    PRIM (X'6000' FC131 X'80')
    SEC (X'6001' FC131 X'95')
    Mode (RESYNC)
```

At step 304, the agent 132 initiates splitting of VOL 2 and VOL 3 once they have been resynchronized or provided with a mirror image In an open system, the script sends the following command to the DB module 130.

```
pairsplit -3 oradev11
```

In MVS, the script issues the following commands.

```
PPRCOPY SUSPEND DDNAME(NEBA80)
    LSS (X'00', X'00')
    PRIM (X'6000' FC131 X'80')
    SEC (X'6001' FC131 X'80')
    ALLDATA (*) PRG
```

Figure 7:
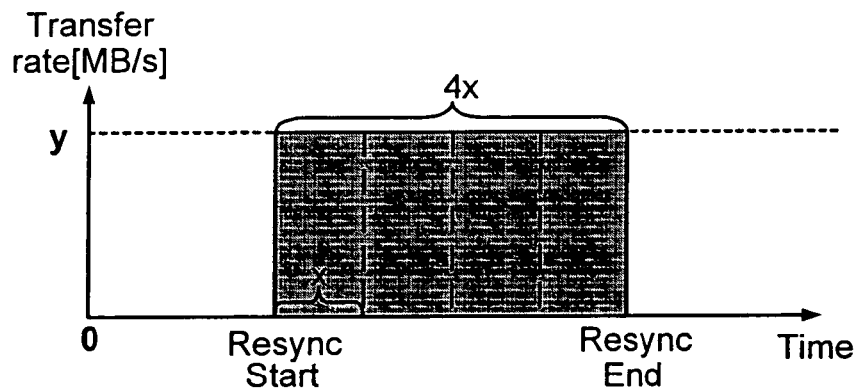
FIG. 7 illustrates time needed to transfer data with a size of 4x*y MB according a conventional method.
Figure 8:
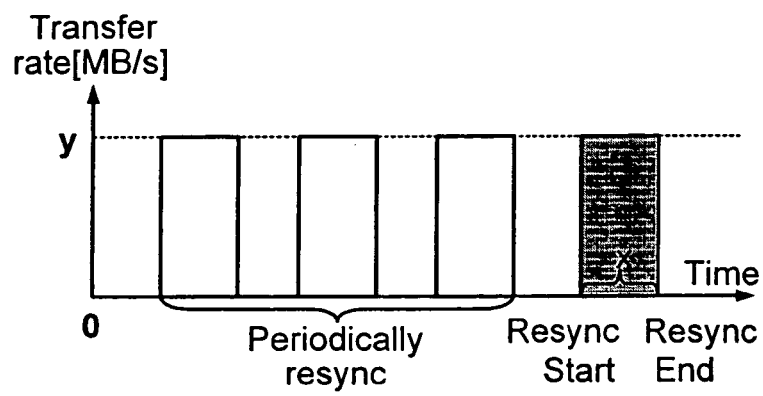
FIG. 8 illustrates time needed to transfer data with a size of 4x*y MB according to one embodiment of the present invention.

When VOL 2 and VOL 3 are resynchronized, if there are a lot of differences between the bitmaps of VOL 2 and VOL 3, the copy process waits for a grip until the resynchronization is finished. For example, the process takes 4x time in case of transferring data with a size of 4x*y MB (FIG. 7). The bandwidth in network is y[MB/s]. If the resynchronization is periodically performed, the wait time for the step 303 is only x[time] since 3x[time] of resynchronization have already been performed (FIG. 8). The remote copy system described above enables this periodic resynchronization to be performed. Accordingly, the steps 301 to 304 are executed at predefined periods to minimize time on resynchronization operation.

The present invention has been described in terms of specific embodiments. The embodiments above are used merely to illustrate the present invention and should not be used to limit the scope of the present invention. The scope of the invention should be interpreted according to the appended claims.

What is claimed is:

1. A method for operating a storage system, the method comprising:
    providing a primary storage device and a secondary storage device in different locations from each other, the primary storage device being associated with a primary host device, the secondary storage device being associated with a secondary host device;
    copying data from a first storage volume to a second storage volume using an internal mirror operation, the first and second storage volumes being provided within the primary storage device, wherein the second storage volume is synchronized to the first storage volume, a write access being suspended for the first storage volume while the second storage volume is being synchronized to the first storage volume;
    copying the data from the second storage volume to a third storage volume using a remote copy operation, the third storage volume being provided in the secondary storage device, wherein the third storage volume is synchronized to the second storage volume after being split from the first storage volume;
    copying the data from the third storage volume to a fourth storage volume using an internal mirror operation, the fourth storage volume being provided within the secondary storage device, wherein the fourth storage volume is synchronized to the third storage volume after being split from the second storage volume;
    while the data is being copied from the third storage volume to the fourth storage volume, executing a database application on the secondary host, the executing comprising accessing a fifth storage volume that is provided in the secondary storage device;
    splitting the third storage volume and the fourth storage volume after the third and fourth storage volumes have been synchronized;
    establishing a link between the third storage volume and the fifth storage volume to synchronize the third and fifth storage volumes; and
    while the third and fifth storage volumes are being synchronized, executing the database application on the secondary host, the executing comprising accessing the fourth storage volume,
    wherein the first, second, third, fourth, and fifth storage volumes are different volumes from each other.

2. The method of claim 1, wherein all of the copying steps are performed using a bitmap copy technique.

3. The method of claim 1, wherein all of the copying steps are asynchronous operations.

4. The method of claim 1, wherein the internal mirror operations are synchronous operations and the remote mirror operation is an asynchronous operation.

5. A method for replicating a volume in a remote copy system, the method comprising:
    synchronizing a first primary volume and a second primary volume, the first and second primary volumes being provided in a primary storage subsystem;
    splitting the first primary volume from the second primary volume once the second primary volume is provided with a mirror image of the first primary volume;
    synchronizing the second primary volume that is provided with the mirror image of the first primary volume with a first secondary volume provided in a secondary storage subsystem, the secondary storage system being provided at a remote location from the primary storage subsystem;
    splitting the second primary volume from the first secondary volume once the first secondary volume is provided with a mirror image of the second primary volume;
    synchronizing the first secondary volume with a second secondary volume provided in the secondary storage subsystem; and
    while the first secondary volume and the second secondary volume are being synchronized, executing a database application on a secondary host associated with the secondary storage subsystem, the executing comprising accessing a third secondary volume,
wherein the first, second, and third secondary volumes are different volumes from each other.

6. The method of claim 5, wherein a primary host associated with the primary storage subsystem is prevented from writing to the first primary volume at least until the first primary volume is split from the second primary volume.

7. The method of claim 5, further comprising:
splitting the first secondary volume from the second secondary volume once the second secondary volume is provided with a mirror image of the first secondary volume;
thereafter, synchronizing the first secondary volume with the third secondary volume.

8. The method of claim 7, further comprising:
establishing a link between the second secondary volume and an application associated with the secondary host to enable the second secondary volume to be accessed using the application while the first secondary volume is being synchronized with the third secondary volume.

9. The method of claim 5, wherein the synchronizing steps involve asynchronous copy operations.

10. The method of claim 5, wherein the third secondary volume includes a mirror image of the first secondary volume from a previous session.

11. A computer readable medium including a computer program for replicating a volume in a remote copy system, the computer program comprising:
code to synchronize a first volume and a second volume, the first and second volumes being provided in a primary storage subsystem;
code to split the first volume from the second volume once the second volume is provided with a mirror image of the first volume;
code to synchronize the second volume that is provided with the mirror image of the first volume with a third volume provided in a secondary storage subsystem, the secondary storage system being provided at a remote location from the primary storage subsystem;
code to split the second volume from the third volume once the third volume is provided with a mirror image of the second volume;
code to synchronize the third volume with a fourth volume provided in the secondary storage subsystem; and
code to execute, while the third volume and the fourth volume are being synchronized, a database application on a secondary host associated with the secondary storage subsystem, the executing comprising accessing a fifth volume provided within the secondary storage subsystem,
wherein each of the first, second, third, fourth, and fifth volumes is a different volume.

12. The computer program of claim 11, wherein the codes to synchronize are codes to initiate the synchronization processes by causing synchronization commands to be issued.

13. The computer program of claim 11, wherein the codes to split are codes to initiate the splitting processes by causing appropriate commands to be issued.

14. The computer program of claim 11, wherein the computer readable medium is included in a primary host associated with the primary storage subsystem.

15. A remote copy system for replicating a volume from a primary storage subsystem to another volume in a secondary storage subsystem, the remote copy system comprising:
a primary host including a script module to issue control commands;
a primary storage subsystem including a first volume and a second volume to store data;
means for synchronizing the first volume and second volume;
means for splitting the first volume from the second volume once the second volume is provided with a mirror image of the first volume;
means for synchronizing the second volume that is provided with the mirror image of the first volume with a third volume provided in the secondary storage subsystem;
means for splitting the second volume from third volume once the third volume is provided with a mirror image of the second volume;
means for synchronizing the third volume with a fourth volume provided in the secondary storage subsystem; and
means for executing a database application on a secondary host associated with the secondary storage subsystem, the executing comprising accessing a fifth volume provided in the secondary storage subsystem, the fifth volume including a mirror image of the third volume from a previous replication session,
wherein each of the first, second, third, fourth, and fifth volumes is a different volume.

* * * * *